United States Patent
Lee et al.

(10) Patent No.: US 10,686,179 B2
(45) Date of Patent: Jun. 16, 2020

(54) SECONDARY BATTERY

(71) Applicant: Samsung SDI Co., Ltd., Yongin-si, Gyeonggi-do (KR)

(72) Inventors: Sangheon Lee, Yongin-si (KR); Wonseok Kim, Yongin-si (KR); Youngchang Lim, Yongin-si (KR); Kyung Kim, Yongin-si (KR); Kyeongyi Heo, Yongin-si (KR); Jandee Kim, Yongin-si (KR); Somin Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 317 days.

(21) Appl. No.: 15/334,214

(22) Filed: Oct. 25, 2016

(65) Prior Publication Data

US 2017/0125776 A1    May 4, 2017

(30) Foreign Application Priority Data

Nov. 2, 2015   (KR) .................. 10-2015-0153252

(51) Int. Cl.
| | |
|---|---|
| *H01M 2/26* | (2006.01) |
| *H01M 2/22* | (2006.01) |
| *H01M 2/06* | (2006.01) |
| *H01M 2/02* | (2006.01) |
| *H01M 2/30* | (2006.01) |
| *H01M 2/20* | (2006.01) |
| *H01M 10/04* | (2006.01) |

(52) U.S. Cl.
CPC ........... *H01M 2/26* (2013.01); *H01M 2/0277* (2013.01); *H01M 2/06* (2013.01); *H01M 2/30* (2013.01); *H01M 10/04* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| 8,268,477 | B2 | 9/2012 | Lee et al. | |
|---|---|---|---|---|
| 8,802,281 | B2 | 8/2014 | Kim | |
| 2010/0047687 | A1* | 2/2010 | Lee | H01M 2/0212 429/185 |
| 2012/0034513 | A1* | 2/2012 | Kim | H01M 2/0275 429/186 |
| 2015/0303412 | A1 | 10/2015 | Lee | |

FOREIGN PATENT DOCUMENTS

| KR | 10-0280715 B | 11/2000 |
|---|---|---|
| KR | 10-2008-0012181 A | 2/2008 |
| KR | 10-1264502 B1 | 5/2013 |
| KR | 10-2013-0114022 A | 10/2013 |
| WO | WO 2014/081239 A1 | 5/2014 |

* cited by examiner

*Primary Examiner* — Yoshitoshi Takeuchi
(74) *Attorney, Agent, or Firm* — Knobbe, Martens, Olson & Bear LLP

(57) ABSTRACT

A secondary battery includes an electrode assembly, a battery case configured to house the electrode assembly and an electrolyte, a lead terminal extending from a coupling section with the electrode assembly, through the battery case and protrudes outside the battery case, and an adhesive layer on the lead terminal having adhesion depending on a reaction of the adhesive layer to the electrolyte. The secondary battery has an improved structure so that an internal short circuit is prevented and stability of the secondary battery is improved.

8 Claims, 5 Drawing Sheets

SECONDARY BATTERY

CROSS-REFERENCE TO RELATED APPLICATION

This application claims the benefit of Korean Patent Application No. 10-2015-0153252, filed on Nov. 2, 2015, in the Korean Intellectual Property Office, the disclosure of which is incorporated herein in its entirety by reference.

BACKGROUND

Field

One or more example embodiments relate to a secondary battery.

Description of the Related Art

With the technological development of mobile devices such as cell phones and laptop computers, demand for secondary batteries as energy sources has rapidly increased. Recently, research and development in secondary batteries for electric vehicles and hybrid vehicles has been widely conducted with respect to their use as alternative energy sources for substituting fossil fuels.

Secondary batteries may be of a single-battery type or a battery-module type in which multiple batteries are electrically connected to each other and bound in one unit, according to the types of external devices that use such batteries.

SUMMARY

One or more example embodiments include a secondary battery having an improved structure so that an internal short circuit is prevented and stability of the secondary battery is improved.

Additional aspects will be set forth in part in the description which follows and, in part, will be apparent from the description, or may be learned by practice of the presented embodiments.

According to one or more example embodiments, a secondary battery includes: an electrode assembly; a battery case configured to house the electrode assembly and an electrolyte; a lead terminal extending from a coupling section with the electrode assembly, through the battery case and protrudes outside the battery case; and an adhesive layer on the lead terminal and having adhesion depending on a reaction of the adhesive layer to the electrolyte.

The adhesive layer may include: a first adhesive layer on an inner surface of the lead terminal that faces the electrode assembly; and a second adhesive layer on an outer surface of the lead terminal that faces the battery case.

The lead terminal may be bent to face a surface of the electrode assembly or a surface of the battery case.

The secondary battery may further include an insulating layer arranged between the lead terminal and the adhesive layer.

The insulating layer may include: a first insulating layer on an inner surface of the lead terminal that faces the electrode assembly; and a second insulating layer on an outer surface of the lead terminal that faces the battery case. The adhesive layer may include: a first adhesive layer on the first insulating layer; and a second adhesive layer on the second insulating layer.

The adhesive layer may be located where the adhesive layer overlaps the coupling section along a lengthwise direction of the lead terminal.

The lead terminal may be bent such that the coupling section faces a surface of the electrode assembly and a surface of the battery case.

In the coupling section, the lead terminal may be coupled to an electrode tab protruding from the electrode assembly.

The electrode tab may include first electrode tabs and second electrode tabs which have different polarities, and the first electrode tabs and second electrode tabs may protrude from the electrode assembly.

According to one or more example embodiments, a secondary battery includes: an electrode assembly; a battery case configured to house the electrode assembly and an electrolyte; a lead terminal extending from a coupling section with the electrode assembly, through the battery case and protrudes outside the battery case; and an adhesive layer on an inner surface of the battery case and having adhesion depending on a reaction of the adhesive layer to the electrolyte.

The adhesive layer may be on the inner surface of the battery case that faces the lead terminal.

The lead terminal may be bent to face the inner surface of the battery case.

The secondary battery may further include an insulating layer arranged between the lead terminal and the adhesive layer.

The insulating layer includes: a first insulating layer on an inner surface of the lead terminal that faces the electrode assembly; and a second insulating layer on an outer surface of the lead terminal that faces the battery case, the second insulating layer being arranged between the lead terminal and the adhesive layer.

In the coupling section, the lead terminal may be coupled to an electrode tab protruding from the electrode assembly, and the number of electrode tabs protruding from the electrode assembly may be plural.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
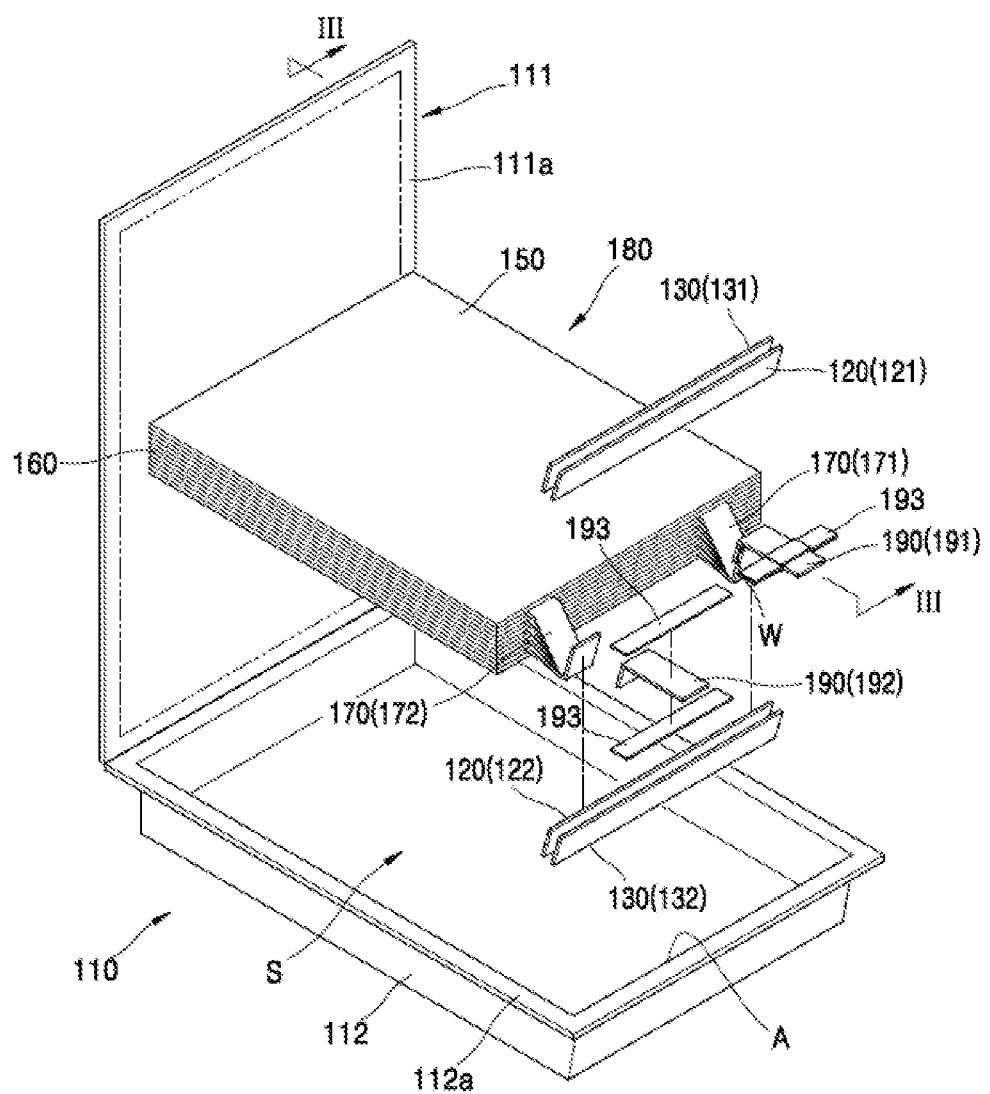
FIG. 1 is an exploded perspective view of a secondary battery according to an example embodiment.

Hereinafter, a secondary battery will be described in detail by explaining example embodiments with reference to the attached drawings. Like reference numerals in the drawings denote like elements.

Figure 2:
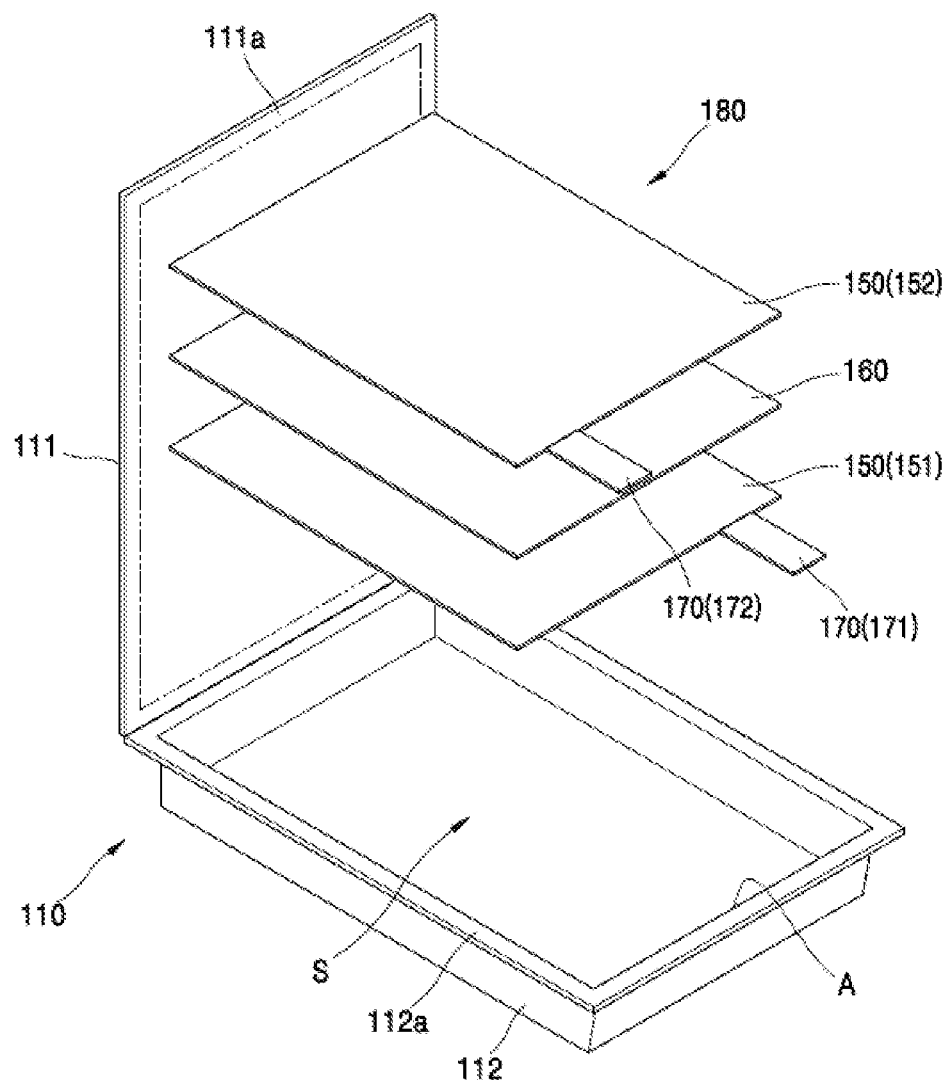
FIG. 2 is an exploded perspective view of a portion of FIG. 1.
Figure 3:
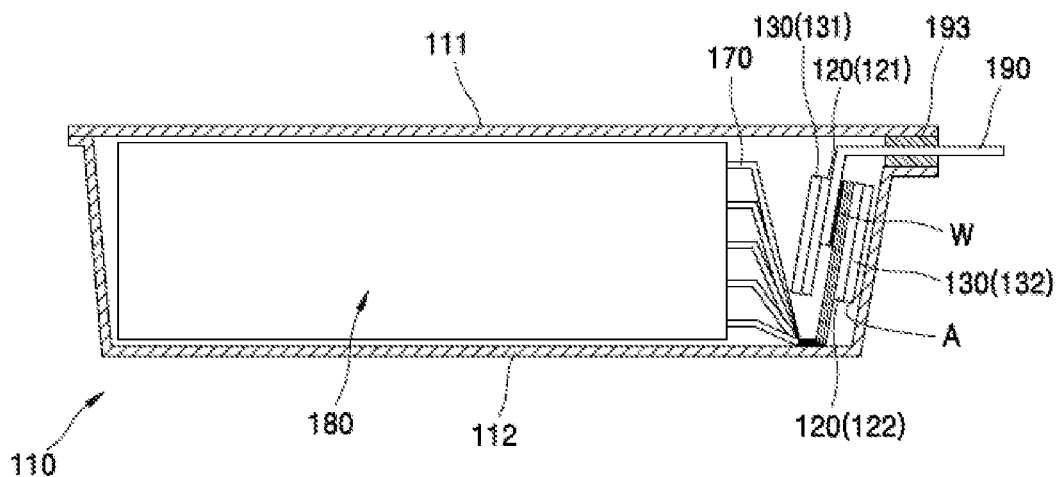
FIG. 3 is a cross-sectional view taken along a line of FIG. 1.

FIG. 1 is an exploded perspective view of a secondary battery according to an example embodiment. FIG. 2 is an exploded perspective view of a portion of FIG. 1. FIG. 3 is a cross-sectional view taken along a line of FIG. 1.

Referring to FIG. 1, the secondary battery includes an electrode assembly 180, electrode tabs 170 extending from the electrode assembly 180, lead terminals 190 electrically connected to the electrode tabs 170, and a battery case 110 for housing the electrode assembly 180.

Referring to FIG. 2, the electrode assembly 180 may be formed when a first electrode plate 151 and a second electrode plate 152 are sequentially stacked with a separator 160 therebetween and may have, for example, a stack structure in which the first electrode plate 151, the separator 160, and the second electrode plate 152, which are cut to certain sizes, are sequentially stacked. The electrode assembly 180 having the above stack structure may have increased battery capacity as more electrode plates 150 such as the first electrode plate 151 and the second electrode plate 152 are stacked. For example, in order to increase discharge capacity of the electrode assembly 180, the first electrode plates 151 and the second electrode plates 152 may be stacked or an area of each of the first electrode plates 151 and second electrode plates 152 may be increased.

The stack structure of the electrode assembly 180 is not limited to the above stack structure, and the electrode assembly 180 may have, for example, a roll-type structure in which the first electrode 151 and the second electrode plate 152 that are of a sheet type are rolled with the separator 160 therebetween.

Although not illustrated, the electrode plate 150 may be formed by spreading an active material on a surface of an electrode collector (not shown) and may include an active material layer (not shown) formed on the electrode collector and at least one surface of the electrode collector. For example, the first electrode plates 151 and the second electrode plates 152 may be a positive electrode plate and a negative electrode plate, respectively, and in this case, the first electrode plate 151 may include a positive electrode collector and a positive electrode active material layer formed on at least one surface of the positive electrode collector, and the second electrode plate 152 may include a negative electrode collector and a negative electrode active material layer formed on at least one surface of the negative electrode collector. Non-coated portions (not shown) where an active material layer is not formed may be formed on edges of the electrode plate 150. A first electrode tab 171 and a second electrode tab 172 may be electrically connected to the first electrode plate 151 and the second electrode plate 152, respectively. For example, the electrode plate 150 may be coupled to the electrode tab 170 by resistance welding, ultrasonic welding, laser welding, or the like.

The electrode tab 170 may include a metallic material having good conductivity. For example, the first and second electrode tabs 171 and 172 may be a positive electrode tab and a negative electrode tab, respectively. The first electrode tab 171 may include a metallic material such as, for example, aluminum or nickel, and the second electrode tab 172 may include a metallic material such as copper or nickel.

As shown in FIG. 1, the electrode tabs 170, which protrude from respective electrode plates 150 stacked on one another, overlap each other, and the electrode tabs 170, which are densely formed, are electrically connected to the lead terminals 190. The lead terminals 190, which form coupling sections with the electrode tabs 170 and extend together, may protrude outside the battery case 110. For example, the electrode tab 170 and the lead terminal 190 may be coupled to each other by ultrasonic welding, etc.

The lead terminal 190 may include a first lead terminal 191, which forms a coupling section W with the first electrode tabs 171 and extends from the electrode tab 171, and a second lead terminal 192, which forms a coupling section W with the second electrode tabs 172 and extends from the second electrode tabs 172.

The battery case 110 provides a housing space S for housing the electrode assembly 180 and insulates the electrode assembly 180 from an external environment in order to protect the same. The battery case 110 may include an exterior material, for example, an aluminum stack sheet, which is formed by stacking resin sheets on both side surfaces of a metallic thin film.

The battery case 110 may include a first case 111 and a second case 112, which form the housing space S for housing the electrode assembly 180, and may seal the electrode assembly 180 by coupling the first case 111 and the second case 112 as they face each other with the electrode assembly 180 therebetween. The electrode assembly 180 and an electrolyte (not shown) may be sealed by thermally fusing sealing portions 111a and 112a of the first and second cases 111 and 112 which face each other. The battery case 110 may seal the electrode assembly 180 and the electrolyte in such a manner that at least a portion of the lead terminal 190 is exposed.

In some embodiments, the lead terminal 190 extends from the electrode assembly 180 and protrudes outside the battery case 110 through the battery case 110. In this case, the lead terminal 190 is insulated from the battery case 110 and may protrude outside by crossing the battery case 110. A sealing tape 193 may be arranged between the battery case 110 and the lead terminal 190 in order to electrically insulate the battery case 110 from the lead terminal 190. The sealing tape 193 may be formed on the lead terminal 190 and may be formed in a section where the lead terminal 190 crosses the battery case 110 along an extension direction of the lead terminal 190. In the section where the lead terminal 190 crosses the battery case 110, the lead terminal 190 may contact the battery case 110 with the sealing tape 193 therebetween. The sealing tape 193 may be used to increase a sealing degree of the battery case 110 by closely contacting the lead terminals 190 with the battery case 110.

For example, the lead terminal 190 may be exposed to the outside through the sealing portions 111a and 112a of the first and second cases 111 and 112. While the sealing portions 111a and 112a of the first and second cases 111 and 112 are sealed by thermal fusing to face each other, the first and second cases 111 and 112 may be sealed with the lead terminal 190 therebetween such that a portion of the lead terminal 190 may be exposed. In this case, the lead terminal 190 may extend to the outside through the sealing portions 111a and 112a. The sealing tape 193 may be arranged on the lead terminal 190 in a section crossing the battery case 110 (the sealing portions 111a and 112a of the battery case 110) and may electrically insulate the lead terminal 190 from the battery case 110. Also, a sealing degree of the battery case 110 may be increased by closely contacting the lead terminal 190 with the battery case 110.

Referring to FIG. 3, the electrode tabs 170 protruding from the electrode plates 150 are collected together at a certain location along a stack direction of the electrode assembly 180 and thus are densely formed, and may be integrally combined with the lead terminal 190 via the coupling section W. For example, the coupling section W may be formed when the electrode tabs 170 are thermally fused with the lead terminal 190 by ultrasonic welding, and the electrode tabs 170 and the lead terminal 190 may be thermally fused with each other by overlapping the electrode tabs 170 and the lead terminal 190 and applying ultrasonic vibrations having a high frequency to the electrode tabs 170 and the lead terminal 190.

The lead terminal 190 forms the coupling section W with the electrode tabs 170. For example, the coupling section W may be formed on a first end portion of the lead terminal 190. In this case, the lead terminal 190 may include the first end portion, which forms the coupling section W with the electrode tabs 170, and a second end portion that extends together from the coupling section W and protrudes outside of the battery case 110. The coupling section W of the lead terminal 190 is formed on the first end portion that is adjacent to the electrode assembly 180 and may be coupled to the electrode tab 170 protruding from the electrode assembly 180.

The lead terminal 190 may be bent to face the surface of the electrode assembly 180 or the surface of the battery case 110. For example, the coupling section W of the lead terminal 190 may be bent to face the surface of the electrode assembly 180 or the inner surface A of the battery case 110. For example, the coupling section W of the lead terminal 190 may be bent to face the surface of the electrode assembly 180 and the inner surface A of the battery case 110. The coupling section W of the lead terminal 190 may be arranged side by side with the surface of the electrode assembly 180 and the inner surface A of the battery case 110 to face the surface of the electrode assembly 180 and the inner surface A of the battery case 110, or may be arranged almost in parallel to the surface of the electrode assembly 180 and the inner surface A of the battery case 110 even if the coupling section W is not arranged side by side with the surface of the electrode assembly 180 and the inner surface A of the battery case 110.

For example, the coupling section W of the lead terminal 190 is bent, and thus a space used to electrically connect the lead terminal 190 to the electrode tabs 170 may decrease. A space for electrically connecting the lead terminal 190 to the electrode tabs 170 is prepared between the electrode assembly 180 and the battery case 110 in a direction in which the electrode tabs 170 protrude. The space actually corresponds to a dead space and the dead space may be reduced by bending the coupling section W of the electrode tabs 170. The dead space occupies a certain amount of volume of the secondary battery without affecting the capacity of the secondary battery.

An adhesive layer 130 may be formed on the lead terminal 190. The adhesive layer 130 may be a polymer film having adhesion by reacting to an electrolyte (not shown). The adhesive layer 130 may include an oriented polystyrene (OPS) film or a polystyrene (PS) film that has adhesion while the adhesive layer 130 is partially melted in reaction to the electrolyte.

The adhesive layer 130 may prevent the lead terminal 190 from moving and may insulate the lead terminal 190. The adhesive layer 130 has adhesion in reaction to the electrolyte and fixes a location of the lead terminal 190 with respect to neighboring components of the lead terminal 190 or fixes locations of the lead terminal 190 and the neighboring components thereof. Thus, the adhesive layer 130 may prevent the lead terminal 190 from moving within the battery case 110, a bent portion of the lead terminal 190 from being deformed due to a spring back, or a short circuit from occurring due to contact with neighboring components as the lead terminal 190 is being deformed due to stress accumulated therein.

The adhesive layer 130 may include a first adhesive layer 131, which is formed on an inner surface of the lead terminal 190 that faces the electrode assembly 180, and a second adhesive layer 132 which is formed on an outer surface of the lead terminal 190 that faces the battery case 110.

The first adhesive layer 131 may be formed on the inner surface of the lead terminal 190 that faces the electrode assembly 180. For example, the first adhesive layer 131 may be formed on the coupling section W of the lead terminal 190 that faces a surface of the electrode assembly 180. The first adhesive layer 131 may be formed on a location where the first adhesive layer 131 overlaps the coupling section W of the lead terminal 190. For reference, forming the adhesive layer 130 on the coupling section W may mean that the adhesive layer 130 is formed on the location where the adhesive layer 130 overlaps the coupling section W even if the adhesive layer 130 is not directly formed on the coupling section W.

The first adhesive layer 131 may have adhesion in reaction to the electrolyte, fill a space between the electrode assembly 180 and the lead terminals 190, prevent the lead terminal 190 from moving based on the adhesion, and thus may fix a shape of the lead terminal 190. The first adhesive layer 131 may fill the space between the electrode assembly 180 and the lead terminals 190 as volume of the first adhesive layer 131 starts expanding depending on the reaction to the electrolyte and may fix the location and shape of the lead terminal 190 by adhesively connecting the electrode assembly 180 to the lead terminals 190.

The second adhesive layer 132 may be formed on the outer surface of the lead terminal 190 that faces the battery case 110. For example, the second adhesive layer 132 may be formed on the coupling section W of the lead terminal 190 that faces the inner surface A of the battery case 110.

The second adhesive layer 132 may have adhesion in reaction to the electrolyte, fill a space between the battery case 110 and the lead terminals 190, prevent the lead terminal 190 from moving based on the adhesion, and thus may fix a shape of the lead terminal 190. The second adhesive layer 132 may fill the space between the battery case 110 and the lead terminals 190 as volume of the second adhesive layer 132 starts expanding depending on the reaction to the electrolyte and may fix the location and shape of the lead terminal 190 by adhesively connecting the battery case 110 to the lead terminals 190.

In short, the adhesive layer 130 fills spaces between the lead terminal 190 and neighboring components thereof in reaction to the electrolyte and fixes the location and shape of the lead terminal 190 by adhesively connecting the lead terminals 190 to the neighboring components, thereby preventing a short circuit of the lead terminal 190.

With regard to a location of the adhesive layer 130, the adhesive layer 130 may be formed on the location where the adhesive layer 130 overlaps the coupling section W of the lead terminal 190 along a lengthwise direction of the lead terminal 190. For example, the adhesive layer 130 may extend from the first end portion of the lead terminal 190 having the coupling section W toward the second end portion thereof.

In an example embodiment, the adhesive layer 130 may be formed on the insulating layer 120. For example, the first insulating layer 121 may be formed on an inner surface of the lead terminal 190, the inner surface of the lead terminal 190 that faces the electrode assembly 180, and the first adhesive layer 131 may be formed on the first insulating layer 121. The second insulating layer 122 may be formed on an outer surface of the lead terminal 190, the outer surface of the lead terminal 190 that faces the battery case 110, and the second adhesive layer 132 may be formed on the second insulating layer 122. The adhesive layer 130 adhesively connects the lead terminal 190 to the neighboring components thereof as the volume expansion occurs in reaction to the electrolyte. The adhesive layer 130 may be formed on an outermost surface of the lead terminal 190 because if another component, for example, the insulating layer 120, is formed on the adhesive layer 130, the insulating layer 120 may disturb the sticky connection of the adhesive layer 130 to the neighboring components.

The insulating layer 120 may be arranged between the lead terminal 190 and the adhesive layer 130. For example, the insulating layer 120 may be formed on the lead terminal 190.

The insulating layer 120 may insulate the lead terminal 190 from a neighboring environment. The lead terminal 190 is bent to face the electrode assembly 180 in which the first and second electrode plates 151 and 152 having different polarities are stacked. When the first lead terminals 191 having different polarities contact the second electrode plate 152 or when the second lead terminals 192 having different polarities contact the first electrode plate 151, a short circuit may occur between the lead terminal 190 and the electrode assembly 180. The insulating layer 120 covers the lead terminal 190, and thus, the short circuit between the lead terminal 190 and the electrode assembly 180 may be prevented.

Also, the lead terminal 190 is bent to face the battery case 110, and when the lead terminal 190 contacts the battery case 110, a short circuit may occur between the lead terminal 190 and the battery case 110. The insulating layer 120 covers the lead terminal 190 such that the short circuit between the lead terminal 190 and the battery case 110 may be prevented.

For example, the insulating layer 120 may include the first insulating layer 121, which is formed on the inner surface of the lead terminal 190 that faces the electrode assembly 180, and the second insulating layer 122 which is formed on the outer surface of the lead terminal 190 that faces the battery case 110. The first insulating layer 121 may be formed on the coupling section W of the lead terminal 190 that faces the surface of the electrode assembly 180. The second insulating layer 122 may be formed on the coupling section W of the lead terminal 190 that faces the inner surface A of the battery case 110. For reference, forming the insulating layer 120 on the coupling section W may mean that the insulating layer 120 may be formed on a location where the insulating layer 120 overlaps the coupling section W even though the insulating layer 120 is not directly formed on the coupling section W.

For example, the first insulating layer 121 is formed on the inner surface of the lead terminal 190 and may insulate the lead terminal 190 from the electrode assembly 180. Also, the second insulating layer 122 is formed on the outer surface of the lead terminal 190 and may insulate the lead terminal 190 from the battery case 110. The lead terminal 190 is bent to face the surface of the battery case 110 and a short circuit may occur, depending on contact with the battery case 110.

The insulating layer 120 may be formed on the location where the insulating layer 120 overlaps the coupling section W of the lead terminal 190. For example, the insulating layer 120 may extend from a first end portion of the lead terminal 190, which forms the coupling section W, toward a second end portion thereof.

Figure 4:
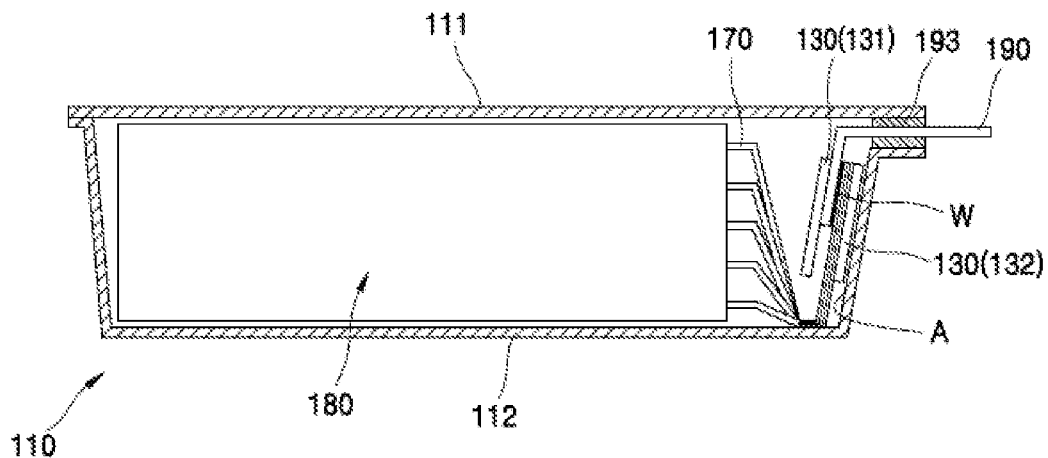
FIG. 4 is a cross-sectional view of a modification of FIG. 3.

FIG. 4 is a cross-sectional view of a modification of FIG. 3.

Referring to FIG. 4, an adhesive layer 130 having adhesion is formed on the lead terminal 190 depending on reaction to an electrolyte (not shown). The adhesive layer 130 may include a first adhesive layer 131, which is formed on an inner surface of the lead terminal 190 that faces the electrode assembly 180, and a second adhesive layer 132 which is formed on an outer surface of the lead terminal 190 that faces the battery case 110.

The coupling section W of the lead terminal 190 may be bent to face a surface of the electrode assembly 180 or a surface of the battery case 110. The first adhesive layer 131 is formed on the coupling section W of the lead terminal 190 that faces the surface of the electrode assembly 180, and the second adhesive layer 132 may be formed on the surface of the battery case 110, the coupling section W of the lead terminal 190 that faces the inner surface A.

Unlike the illustration of FIG. 3, FIG. 4 shows that an insulating layer is not formed between the adhesive layer 130 and the lead terminal 190. The adhesive layer 130 may be a polymer film having adhesion in reaction to the electrolyte. For example, the adhesive layer 130 adhesively connects the lead terminal 190 to the electrode assembly 180 or to the battery case 110, depending on the reaction to the electrolyte, prevents the lead terminal 190 from moving, and fixes a shape of the lead terminal 190. Also, the adhesive layer 130 may function as an insulating layer for insulating the lead terminal 190 from the electrode assembly 180 and the lead terminal 190 from the battery case 110 and preventing a short circuit between the lead terminal 190 and the electrode assembly 180 and between the lead terminal 190 and the battery case 110.

Figure 5:
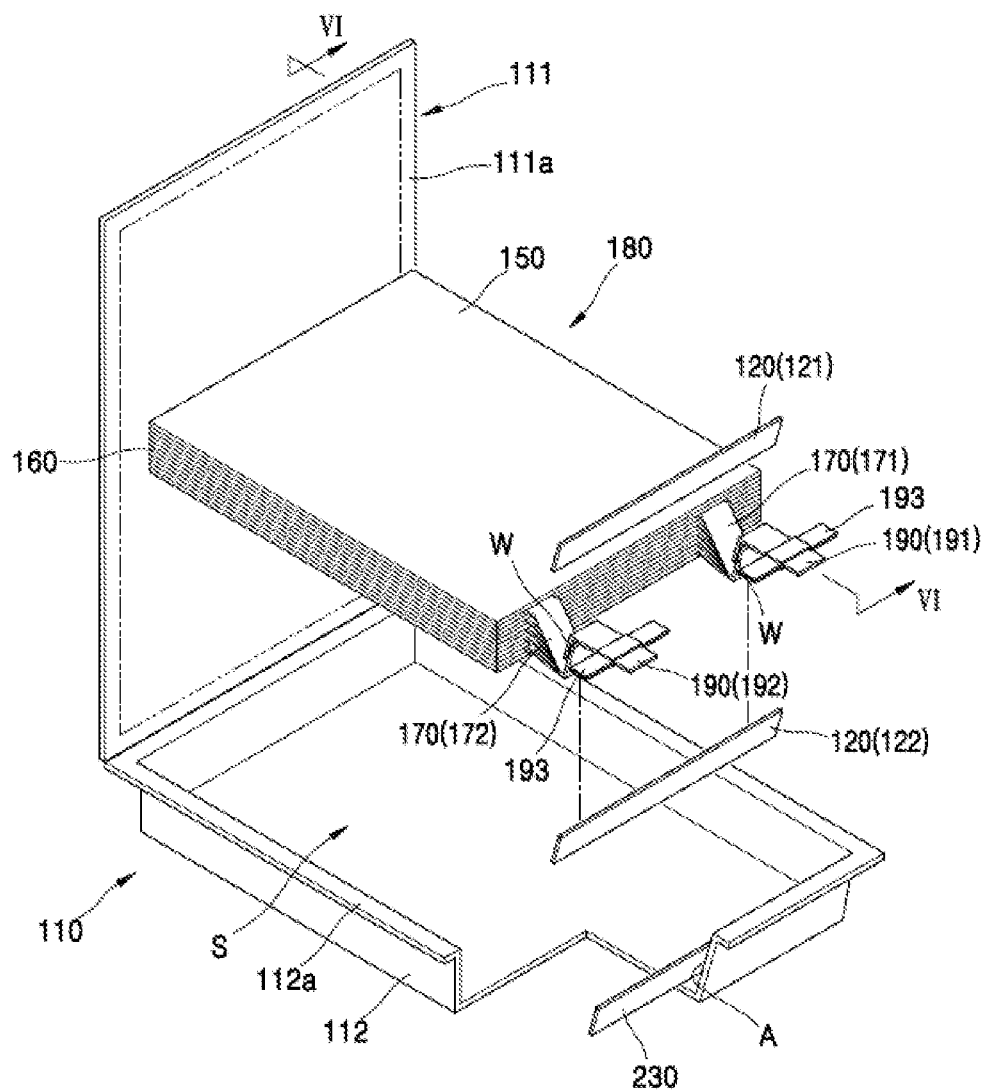
FIG. 5 is an exploded perspective view of a secondary battery according to another example embodiment.
Figure 6:
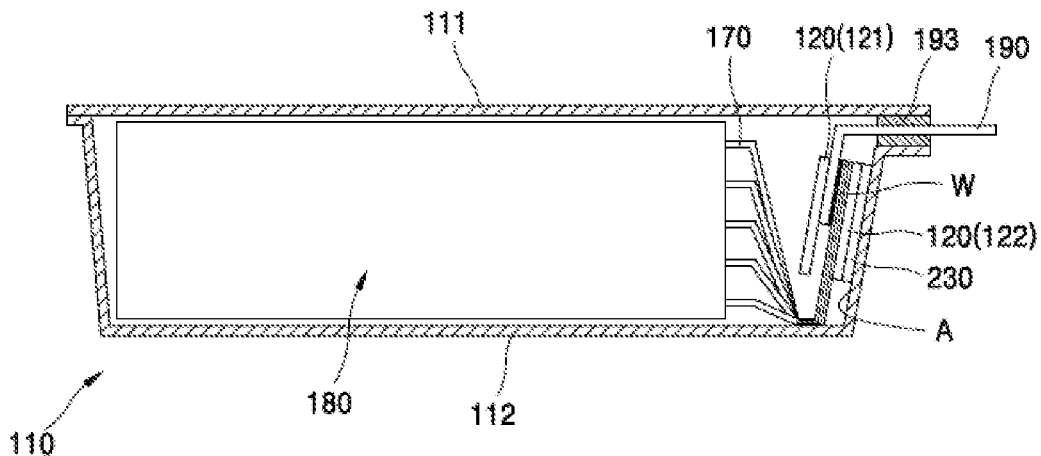
FIG. 6 is a cross-sectional view taken along a line VI-VI of FIG. 5.

FIG. 5 is an exploded perspective view of a secondary battery according to another example embodiment. FIG. 6 is a cross-sectional view taken along a line VI-VI of FIG. 5.

Referring to the drawings, an adhesive layer 230 is formed on a surface of the battery case 110 for housing the electrode assembly 180. In an example embodiment, the adhesive layer 230 may be formed on the inner surface A of the battery case 110 which is adjacent to the lead terminal 190. The adhesive layer 230 may be formed on the battery case 110 from which the lead terminal 190 protrudes, the inner surface A of the battery case 110 that extends in a direction crossing the lead terminal 190.

The adhesive layer 230 may be formed on the inner surface A of the battery case 110 that faces the lead terminal 190. The lead terminal 190 is bent to face the battery case 110, and the adhesive layer 230 may be formed in the inner surface A of the battery case 110 that faces the lead terminal 190. For example, the adhesive layer 230 may overlap the coupling section W of the lead terminal 190.

The coupling section W of the lead terminal 190 may be bent to face the inner surface A of the battery case 110. The coupling section W of the lead terminal 190 may be arranged side by side with the inner surface A of the battery case 110 or may be arranged almost in parallel to the inner surface A of the battery case 110 to face the same even though the coupling section W is not arranged side by side with the inner surface A of the battery case 110. The adhesive layer 230 may be formed on the inner surface A of the battery case 110 that faces the coupling section W of the lead terminal 190.

The adhesive layer 230 may include a polymer film having adhesion depending on the reaction to the electrolyte. For example, the adhesive layer 230 may fill a space between the lead terminal 190 and the battery case 110 as a volume of the adhesive layer 230 expands depending on the reaction to the electrolyte, may prevent the lead terminal 190 from moving, and may fix the shape of the lead terminal 190. Accordingly, a short circuit between the lead terminal 190 and neighboring components of the lead terminal 190 due to a movement of the lead terminal 190 or a change thereof, may be prevented.

In an example embodiment, the adhesive layer 230 may be formed on a second insulating layer 122. For example, the second insulating layer 122 may be formed on an outer side of the electrode lead 190, an outer side of the lead terminal 190 that faces the battery case 110, and the adhesive layer 230 may be formed on the second insulating layer 122. Since the adhesive layer 230 adhesively connects the lead terminal 190 to neighboring components of the lead terminal 190 as a volume of the adhesive layer 230 increases in reaction to the electrolyte, the adhesive layer 230 may be formed on an outermost side of the lead terminal 190. If another component, for example, the second insulating layer 122, is formed on the adhesive layer 230, the second insulating layer 122 may disturb adhesive connection of the adhesive layer 230 to neighboring components.

The insulating layer 120 may be formed on the lead terminal 190. The insulating layer 120 may include the first insulating layer 121, which is formed on an inner surface of the lead terminal 190 that faces the electrode assembly 180, and the second insulating layer 122 which is formed on an outer surface of the lead terminal 190 that faces the battery case 110. In this case, the second insulating layer 122 may be arranged between the lead terminal 190 and the adhesive layer 230.

The insulating layer 120 may insulate the lead terminal 190 from a neighboring environment. The lead terminal 190 is bent to face the electrode assembly 180 or the battery case 110, and when the lead terminal 190 contacts the electrode assembly 180 or the battery case 110, a short circuit may occur between the lead terminal 190 and the electrode assembly 180 or between the lead terminal 190 and the battery case 110. The insulating layer 120 may prevent a short circuit between the lead terminal 190 and the electrode assembly 180 or between the lead terminal 190 and the battery case 110 by covering the lead terminal 190.

Figure 7:
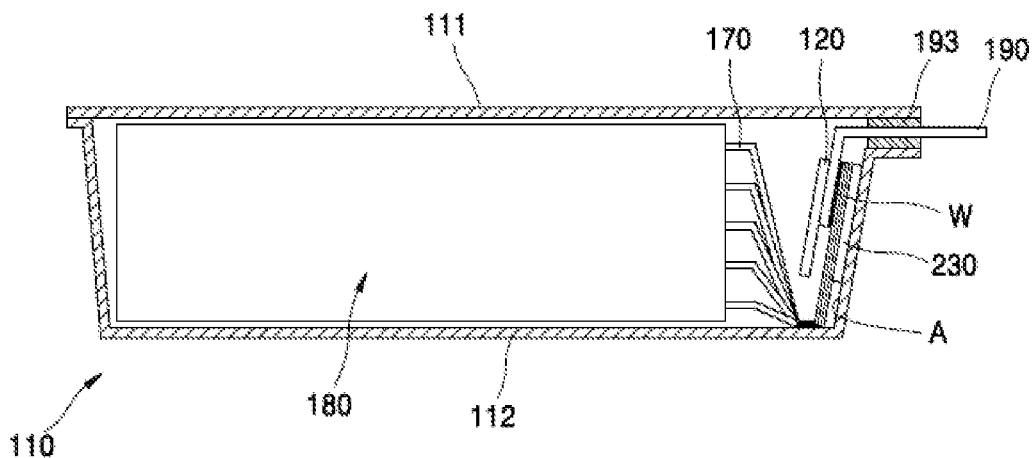
FIG. 7 is a cross-sectional view of a modification of FIG. 6.

FIG. 7 is a cross-sectional view of a modification of FIG. 6.

Referring to FIG. 7, an adhesive layer 230 is formed in a side of the battery case 110 housing the electrode assembly 180. In an example embodiment, the adhesive layer 230 may be formed on an inner surface A of the battery case 110 that is adjacent to the lead terminal 190. The adhesive layer 230 may be formed on a surface of the battery case 110 from which the lead terminal 190 protrudes, the inner surface A of the battery case 110 extending in a direction crossing the lead terminal 190.

A coupling section W of the lead terminal 190 may be bent to face the inner surface A of the battery case 110. The adhesive layer 230 may be formed on the inner surface A of the battery case 110 which faces the coupling section W of the lead terminal 190.

Unlike the example embodiment of FIG. 6, in the present example embodiment, an insulating layer is not formed between the adhesive layer 230 and the lead terminal 190. The adhesive layer 230 may include a polymer film having adhesion produced in reaction to an electrolyte. For example, the adhesive layer 230 may adhesively connect the battery case 110 to the lead terminal 190 depending on the reaction to the electrolyte, prevent the lead terminal 190 from moving, and fix the shape of the lead terminal 190. Also, the adhesive layer 230 may function as an insulating layer that insulates the lead terminal 190 from the battery case 110 and prevents a short circuit therebetween.

The insulating layer 120 may be formed on the inner surface of the lead terminal 190 that faces the electrode assembly 180. The insulating layer 120 may insulate the lead terminal 190 from the neighboring environment. The lead terminal 190 is bent to face the electrode assembly 180, and when the lead terminal 190 contacts the electrode assembly 180, a short circuit may occur between the lead terminal 190 and the electrode assembly 180. The insulating layer 120 covers the lead terminal 190 and may prevent the short circuit from occurring between the lead terminal 190 and the electrode assembly 180.

According to one or more example embodiments, an adhesive layer, which adhesively connects a lead terminal to neighboring components in reaction to an electrolyte, may prevent the lead terminal from moving within a battery case and may fix a shape of the lead terminal. Accordingly, a short circuit of the lead terminal is prevented, and stability of a secondary battery is improved.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A secondary battery comprising:
    an electrode tab electrically connected to an electrode assembly;
    a battery case housing the electrode assembly and an electrolyte, the battery case comprising an upper portion and a lower portion that are sealed at respective sealing portions;
    a lead terminal electrically connected to the electrode tab at a coupling section, the lead terminal extending from the coupling section to protrude outside of the battery case through the sealing portions; and
    an adhesive layer on the lead terminal, wherein the adhesive layer extends in a lengthwise direction of the lead terminal to overlap the coupling section while being separated from the sealing portions,
    wherein the adhesive properties of the adhesive layer depend on a reaction of the adhesive layer with the electrolyte.

2. The secondary battery of claim 1, wherein the adhesive layer comprises:
    a first adhesive layer on an inner surface of the lead terminal facing the electrode assembly; and
    a second adhesive layer on an outer surface of the lead terminal facing the battery case.

3. The secondary battery of claim 2, wherein the lead terminal is bent to face a surface of the electrode assembly or a surface of the battery case.

4. The secondary battery of claim 1, further comprising an insulating layer between the lead terminal and the adhesive layer.

5. The secondary battery of claim 4, wherein the insulating layer comprises:
    a first insulating layer on an inner surface of the lead terminal facing the electrode assembly; and
    a second insulating layer on an outer surface of the lead terminal facing the battery case,
    wherein the adhesive layer comprises:

a first adhesive layer on the first insulating layer; and
a second adhesive layer on the second insulating layer.

6. The secondary battery of claim 1, wherein the lead terminal is bent such that the coupling section faces a surface of the electrode assembly and a surface of the battery case.

7. The secondary battery of claim 1, wherein, in the coupling section, the lead terminal is physically coupled to an electrode tab.

8. The secondary battery of claim 7, wherein the electrode tab comprises first electrode tabs and second electrode tabs which have different polarities, and
the first electrode tabs and second electrode tabs protrude from the electrode assembly.

\* \* \* \* \*